United States Patent [19]
Blank et al.

[11] 3,871,677
[45] Mar. 18, 1975

[54] HEAVY DUTY TRUCK SUSPENSION

[75] Inventors: Wallace J. Blank; Thomas H. Watson, both of Oshkosh, Wis.

[73] Assignee: Oshkosh Truck Company, Oshkosh, Wis.

[22] Filed: Oct. 4, 1971

[21] Appl. No.: 186,296

[52] U.S. Cl. .................... 280/104.5 A, 280/43.22
[51] Int. Cl. ............................................ B60g 11/20
[58] Field of Search ............ 280/104.5 B, 104.5 A, 280/104.5 R, 43.13, 43.22; 180/22 D, 22 E, 180/24.02

[56] References Cited
UNITED STATES PATENTS

| | | |
|---|---|---|
| 1,930,208 | 10/1933 | Marcum ...................... 280/104.5 A |
| 2,702,194 | 2/1955 | Alden .............................. 280/104.5 |
| 2,777,529 | 1/1957 | Harbers ........................... 280/24.02 |
| 2,877,023 | 3/1959 | Shaffer ......................... 280/104.5 R |
| 3,166,142 | 1/1965 | Frazier ............................ 280/104.5 |

Primary Examiner—Philip Goodman
Assistant Examiner—John A. Carroll
Attorney, Agent, or Firm—Baker & McKenzie

[57] ABSTRACT

A suspension system for an automotive tandem axle group usable, for example, in off highway construction vehicles in which the suspension is mounted to the vehicle chassis at four points which lie outside the axle span, said suspension system having a variable spring rate and means for allocating loads in any ratio of from 30 – 70 to 70 – 30 between said tandem axles.

16 Claims, 7 Drawing Figures

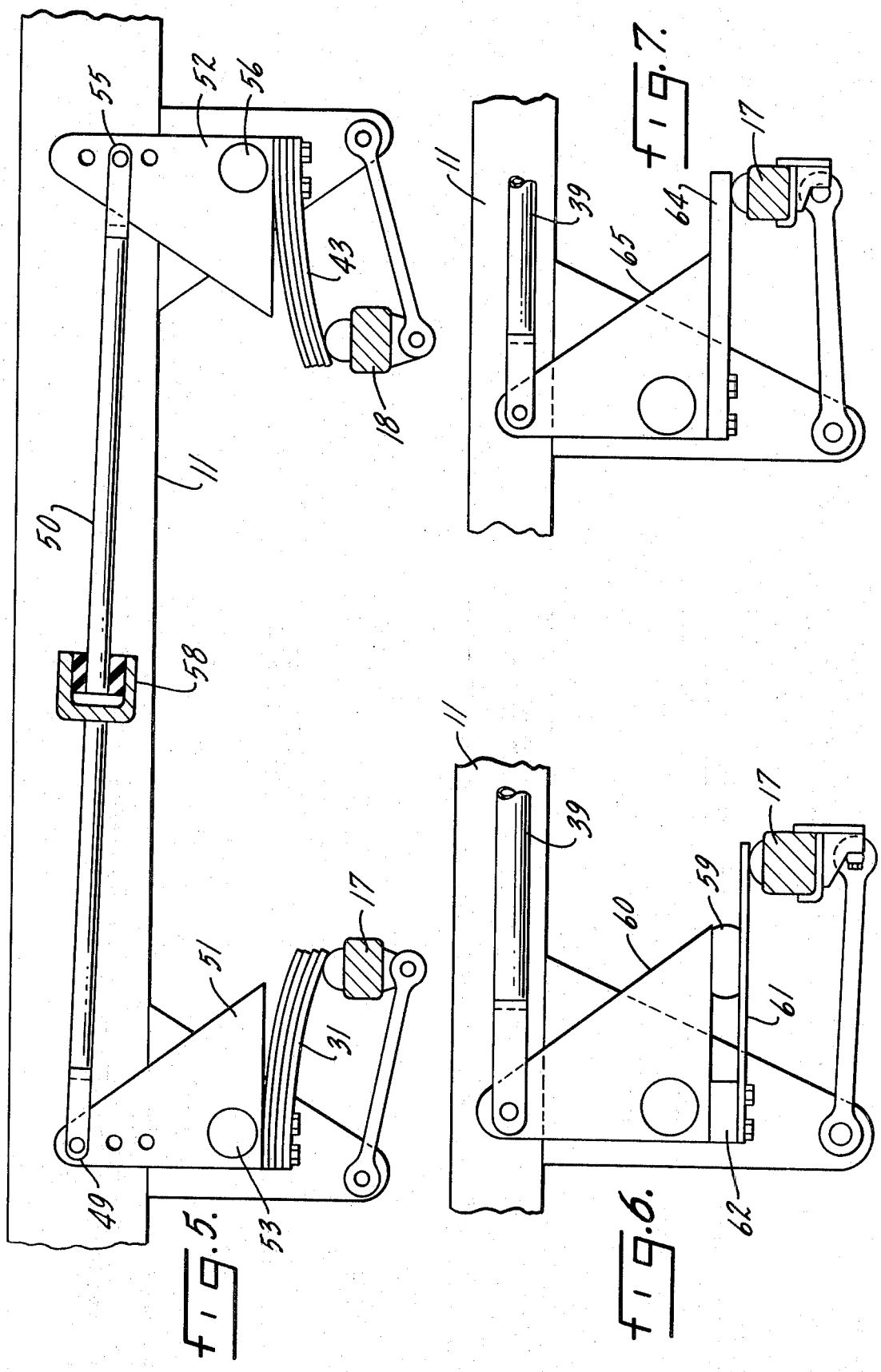

3,871,677

HEAVY DUTY TRUCK SUSPENSION

THE SUMMARY OF THE INVENTION

This invention relates to a suspension system for an automotive tandem axle group. Specifically, the invention relates to the type of suspension which is mounted to the chassis of a vehicle at four points, two of the points being located to the front of the forward axle, and the remaining two points to the rear of the rearward axle.

A primary object of this invention is to provide a suspension which results in a lower stress level in the frame rails of the base structure to which the suspension is mounted so that smaller, lighter frame rails may be used as contrasted to current constructions.

Another object is to decrease the deflection of the frame rails to the rear of the tandem axis.

Yet a further object is to provide a suspension having a variable spring rate which may be tailored to a variety of specific vehicle applications.

Yet a further object is to provide a suspension having means for distributing or allocating loads between two suspended axles from a ratio of about 30 – 70 percent to about 70 – 30 percent front to rear respectively.

A further object of the invention is to provide a suspension system which may be standardized for a large number of axle spacings so as to enable a manufacturer to easily build suspensions for variable axle spacings by altering a minimum number of parts, and specifically as few as two parts.

A further object is to accomplish the prior object by a structure which does not appreciably increase the weight of the suspension irrespective of the axle spacing.

Yet another object of the invention is to provide a suspension which results in decreased chassis roll during operation of the vehicle as contrasted to current constructions.

Yet a further object of the invention is to provide a suspension which eliminates, or substantially eliminates, the tendency of the axles to hop during operation.

Yet a further object of the invention is to provide a suspension which maximizes allowable articulation, that is, up and down travel, of the axles so that traction may be maintained during off-highway operation.

A further object of this invention is to provide a suspension having provisions for a solid suspension where the vehicle operation so requires.

Yet a further object of the invention is to provide a suspension which, if desired, may utilize a rubber spring.

Yet a further object is to provide a suspension as above described having dampeners capable of limiting the transmitted force from the axle system to the chassis when required by the vehicle application.

Further objects and advantages of the invention will become apparent from the following description of the invention.

DESCRIPTION OF THE DRAWINGS

The invention is illustrated more or less diagrammatically in the accompanying figures wherein:

FIG. 5 is a diagrammatic view of the suspension illustrating unequal proportioning of the load between the forward and rear axles and a dampening system;

FIG. 6 is a schematic view of a portion of the suspension illustrating use of a rubber load pad in lieu of a spring; and FIG. 7 is a schematic view of the suspension illustrating use of a solid bar in lieu of a spring to provide a solid ride when working conditions so require.

Like reference numerals will be used to refer to like parts throughout the following description of the figures.

DETAILED DESCRIPTION

Figure 1:
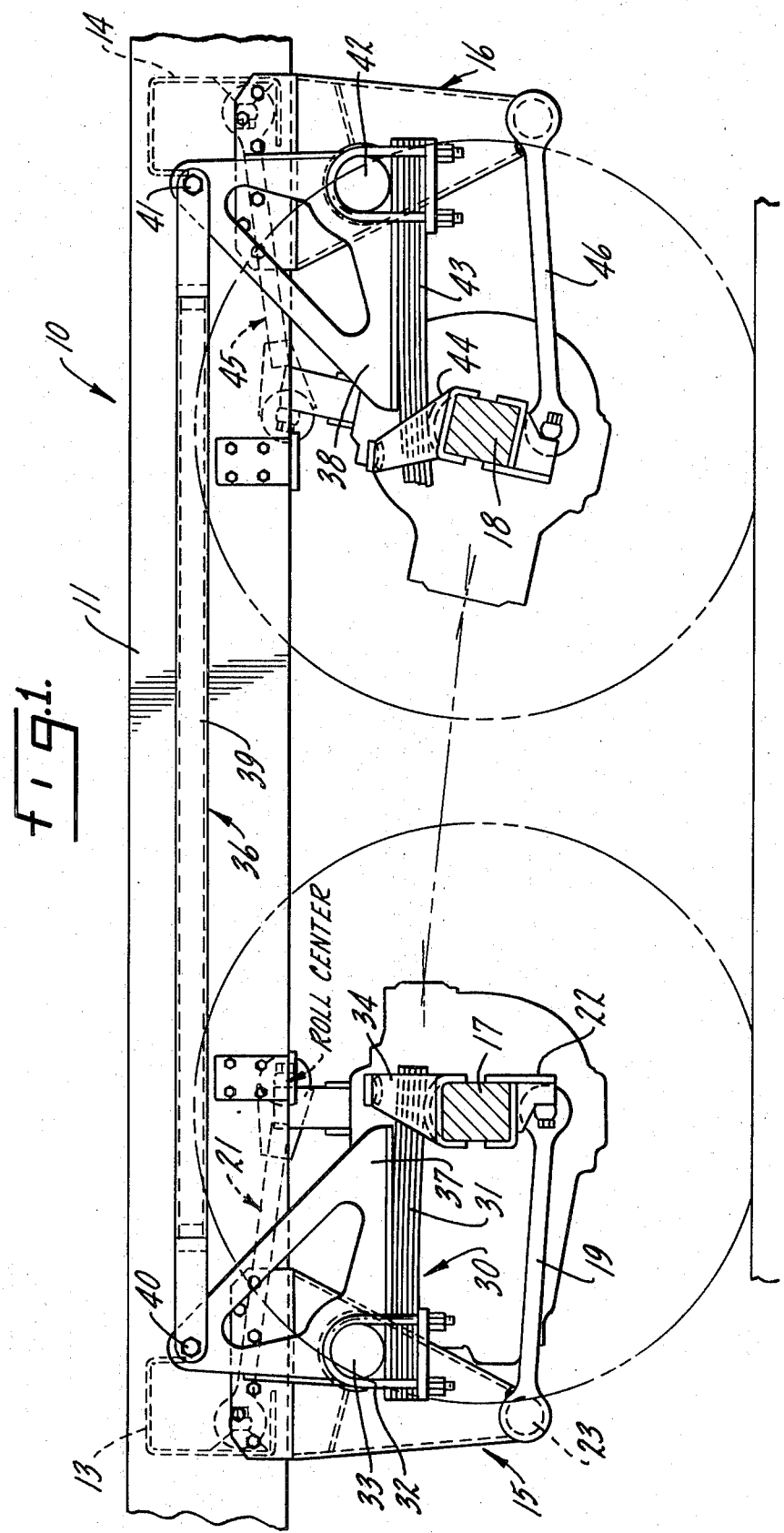
FIG. 1 is a schematic side view of a suspension having leaf type springs, the suspension in this instance being adapted for 50 – 50 percent load distribution between axles.
Figure 2:
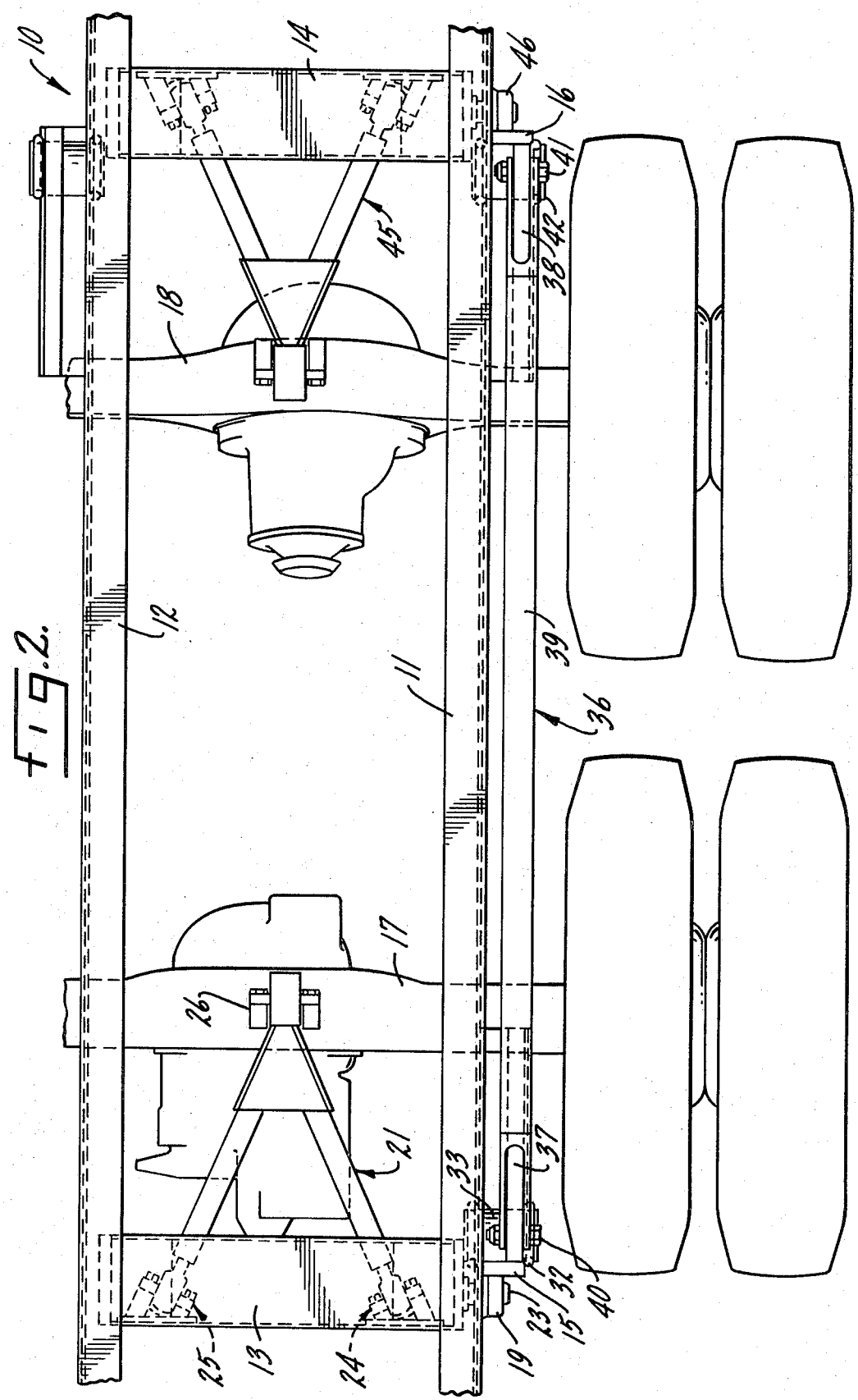
FIG. 2 is a top plan view of FIG. 1.
Figure 3:
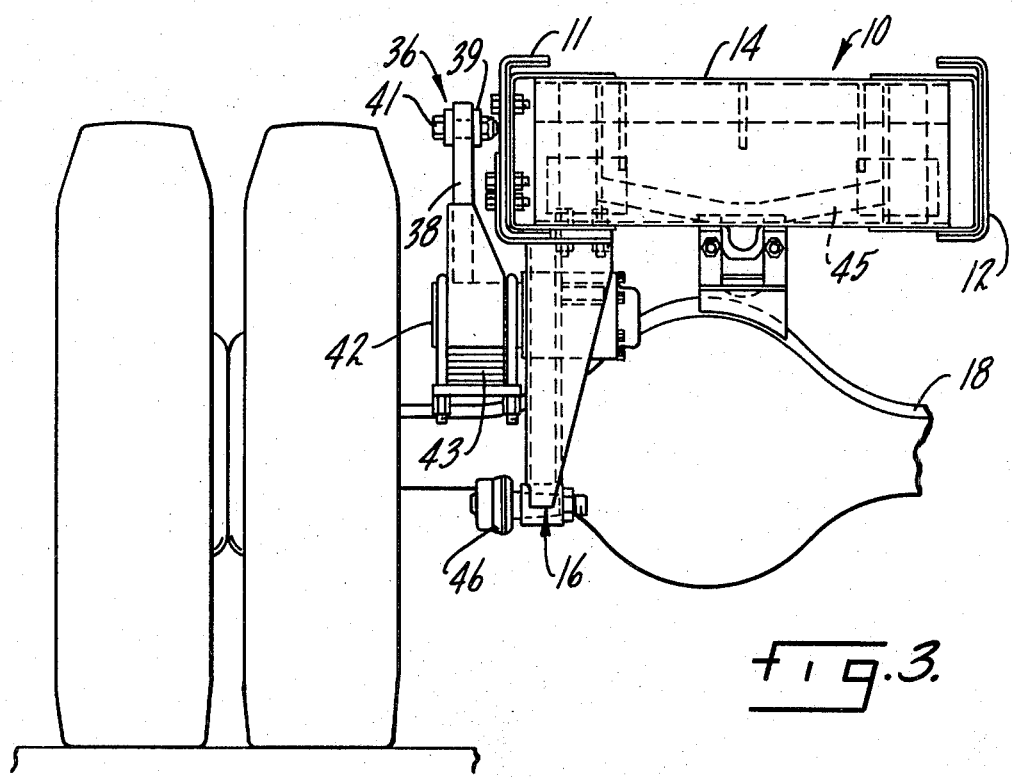
FIG. 3 is an end view as viewed from the right side of FIG. 1.

Referring initially to FIGS. 1, 2 and 3, a chassis is illustrated generally at 10, the chassis consisting of two frame rails 11, 12 and a pair of cross members 13, 14.

A pair of pivot brackets are indicated at 15 and 16, front pivot bracket 15 being secured to frame rail 11 forwardly of front axle 17 and rear pivot bracket 16 being secured to frame rail 11 rearwardly of rear axle 18. The wide span between pivot brackets 15 and 16, as contrasted to the shorter span between axles 17 and 18, results in a lower stress level in the frame rails 11 and 12.

The location of axles 17 and 18 is governed by three torque rods per axle, consisting of two lower torque rods — one on the left and one on the right side of the axle, and a third upper torque rod located above the axles. For purposes of description, the arrangement of parts associated with the front axle only will be described since the construction is identical from axle to axle in all functional and structural aspects.

Forward axle 17, left side bottom torque rod 19, and upper torque rod 21 are illustrated best in FIGS. 1 and 2. The right end of bottom torque rod 19 is connected to an axle bottom torque rod bracket 22 which in turn is welded or otherwise suitably secured to front axle 17. The left end of bottom torque rod 19 is pivotally connected to the bottom of pivot bracket 15 by means of a stub shaft 23 carried by pivot bracket 15.

Upper torque rod 21, which, as best seen in FIG. 2, is of a V-shaped configuration, is pivotally connected by suitable bracket structures, indicated generally at 24 and 25, to cross member 13, and thereby the chassis 10. The right end of upper torque rod 21 is pivotally connected to an upper torque rod bracket indicated generally at 26, which in turn is welded or otherwise suitably secured to front axle 17.

The bottom torque rods associated with each axle are designed to transmit fore-and-aft forces only. Upper torque rod 21 is designed to transmit side or lateral forces to the chassis as well as fore-and-aft forces. The three torque rods guide the axle motion.

Figure 4:
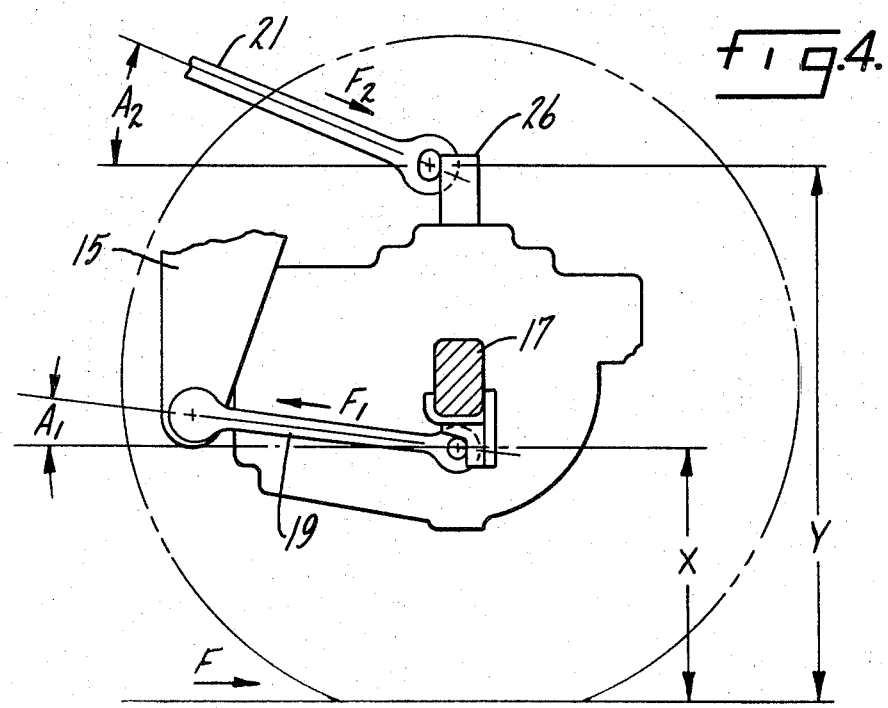
FIG. 4 is a schematic view illustrating the basis for selection of the optimum angular dispositions of the upper and lower torque rods.

The location, orientation, and length of the torque rods is important in accomplishing one of the prime objectives of the suspension, controlling axle hop. FIG. 4 illustrates the correct positioning of the torque rods to accomplish this object. Braking or acceleration results in a force F acting on the tires and causes a force $F_1$, to be felt in each of the bottom torque rods, and a force $F_2$ to be transmitted by the upper torque rod. The equation for establishing the proper torque rod angles is as follows, the physical designations being seen from FIG. 4.

$$\tan A_2 = \tan A_2 \, X/Y$$

Experience has shown that axle hop will be held to an acceptable level if the torque rods are held to within plus or minus 5° of the theoretical optimum angles as derived from the aforesaid equation.

Means for absorbing vertical forces are indicated generally at 30. Said means comprise, in this instance, a steel leaf spring 31 whose left end is connected, as by bolt 32, to a stub shaft 33 projecting outwardly from pivot bracket 15, and whose right end bears against an axle spring bracket 34 which is welded or otherwise firmly secured to axle 17. It will be noted that two springs are provided, one for each side of the axle, or four springs per suspension assembly.

Means for transmitting load from one axle to another is indicated generally at 36, said means comprising a pair of walking beams 37, 38 and a force transmitting or equalizing rod 39. Walking beam 37 is pivotly mounted on stub shaft 33 and, as best seen in FIGS. 1 and 3, arranged to bear against spring 31. A variable spring rate is inherent in this design for as spring 31 deflects under increasing load, the spring bears against the walking beam 37 at a point ever closer to the axle 17. The effect is that of loading a cantilever spring whose effective length becomes shorter as it deflects, and the spring rate becomes greater. Walking beam 38 is mounted to pivot bracket 16 and bears against its associated spring 43 in similar fashion. A longitudinal force transmitting member 39 is pivotally connected as at 40 and 41 to the upper ends of walking beams 37,38.

The action of the above described suspension is as follows.

When the vehicle travels forward and the forward axle 17 passes over a rise, the following occurs.

Forward axle 17 rises and spring 31 consequently deflects somewhat with the momentary increase in load. As a result of the deflection of spring 31, walking beam 37 pivots counter-clockwise on shaft 33. Since equalizing rod 39 is attached to walking beam 37 at a point above the axis of shaft 33, the equalizing rod is pulled forward concurrently with counter-clockwise rotation of walking beam 37.

Since equalizing rod 39 is also attached to rear walking beam 38, walking beam 38 likewise rotates in a counterclockwise direction about its mounting shaft 42. This counterclockwise rotation of walking beam 38 causes spring 43 to deflect, and an increased load, equal to the momentary increased load at the forward axle 17, is thereby exerted through the rear axle spring bracket 44 to the rear axle 18.

Another primary consideration in the design of the suspension is to raise the roll center at the rear axles. It will be understood that the roll center is the point about which the body rolls as, for example, when the vehicle is negotiating a corner. Because the center of gravity of the majority of vehicles which may use this suspension is quite high, it is important to have the roll center of the chassis high also. With a normal leaf spring suspension the roll center is determined by the spring characteristics, but is generally at approximately the spring anchorage height. In the present invention, however, by designing the upper torque rod 21 to transmit lateral forces, the axle is forced to pivot at the connection with the upper torque rod 21. In the same way the chassis must pivot at this point, and thus this point becomes the roll center of the chassis. As can be best appreciated from FIG. 1 the roll center is very high and, in actual construction, can be between about 14 and 16 inches above the height of the axles.

Another important benefit of the present invention is an increase in allowable up and down motion (articulation) of the axles. This benefit is derived basically from the location and orientation of the torque rods.

In present constructions the factor which normally limits the up and down motion of the axles is the allowable angularity and length of slip in the interaxle propeller shaft. In this suspension the angle of the upper torque rods 21,45, with respect to the horizontal has been made greater than the angle of the bottom torque rods 19,46. Thus, while the bottom torque rod forces the lower portion of the axle to travel in nearly a straight line when travelling upward, the upper torque rod forces the upper portion of the axle to move away from the pivot bracket. This results in a tipping of the forward axle 17 in a clockwise direction when travelling upward, and a tipping in a counter-clockwise direction when travelling downward. In the same manner, the rear axle 18 moves in a counterclockwise direction when articulating upward, and in a clockwise direction when tipping downward. The concurrent tipping actions of the axles 17 and 18 results in a decrease in both the required slip length and angularity of the inter-axle propeller shaft which in turn allows the articulation to be increased.

In a conventional application of a suspension with a parrallelogram linkage (that is, where the angle of the axle does not change when the axle moves up and down) the angle of the universal joints would exceed 35° and/or the required slip in the propeller shaft would exceed 5.50 inches with approximately 9.50 inches of axle articulation, based on a 52 inches axle spacing. By contrast, the tipping of the axles inherent in this invention allows 12 inches of articulation before the aforesaid limits are reached.

From a manufacturer's standpoint, in order to maintain maximum benefit from allowable legal load limits established by the various regulatory agencies, it is desirable to be able to offer a suspension with several available tandem axle spacings. In current practice this is normally accomplished by either increasing the length of a beam or a spring which supports the axle. Now, because the length from the support point to the axle is increased, the bending moment and thus the stress level in the beam or spring is also increased. It is therefore necessary to strengthen the beam or spring, and the weight is appreciably increased, not only to make it longer, but also because it must be made stronger due to the increase in stress.

By contrast, in this invention the only pieces which are changed when the tandem spacing is to be increased are the two equalizing rods 39. It will be noted that the load on each rod is pure tension not bending, and therefore the load and stress level in the rods are not increased. As a consequence the rods can simply be made longer with no need to make them stronger and the weight of the suspension is thus not appreciably increased.

The embodiment of FIGS. 1, 2 and 3 illustrate a system whereby the load is equalized between the two axles. By contrast, FIG. 5 illustrates load proportioning between the two axles. Equalizing rod 50 is here attached to the walking beams 51,52 at different relative points, beam to beam. Thus, with respect to walking beam 51, the left end 49 of equalizing rod 50 is attached to the beam in the upper of three radial hole positions, and therefore at a maximum distance from the beam mounting shaft 53. The right end 55 of rod 50 is connected to its associated beam 52 at the middle of three illustrated locations and accordingly is located at a lesser distance from its mounting shaft 56 than is the left hand 49 of rod 50. As a result, and assuming a given tension in equalizing rod 50, the moment in the forward walking beam 51 will be greater than the moment in the rear walking beam 52. The spring force on the forward axle 17 will be greater than the spring force on the rear axle 18, and thus the load carried on the forward axle 17 will be greater than the load carried on the rear axle 18.

By suitable proportioning of the radial distances between the walking beam mounting shafts and the points of connection of the ends of the equalizing rod 50 to the walking beams, load proportioning may be accomplished from about 30 percent front – 70 percent rear, to about 70 percent front – 30 percent rear.

Certain applications may require a dampener in the suspension system to lessen the transmitted forces to the chassis. A typical dampener 58 is illustrated in FIG. 5 as part of the equalizing rod 50. This Figure illustrates rubber in shear between the two portions of the equalizing rod 50. The dampening effect could however also be accomplished with a hydraulic dampener in a manner analagous to an automotive shock absorber.

In FIG. 6 an arrangement is illustrated in which a rubber load pad is employed in lieu of a steel spring 31. The rubber load pad 59 is mounted between its associated walking beam 60 and the support bar 61 which rides on the axle 17. The spacer is indicated at 62. The action of the suspension is the same as previously described in connection with the embodiments of FIGS. 1 – 5 except that in this instance the deflection in the rubber load pad 59 takes the place of leaf spring deflection.

In some applications it is beneficial to have a solid suspension, that is, a suspension having little if any spring deflection. A suspension suitable for such a requirement is illustrated in FIG. 7. In this instance the support bar 64 is attached to the walking beam 65, and bears against the top of axle 17. The action of the suspension is the same as the action previously described in connection with the embodiments of FIGS. 1 – 6, except in this embodiment no spring deflection is available.

Although several embodiments of the invention have been illustrated and described, it will at once be apparent to those skilled in the art that other modifications may be made within the scope of the invention. Accordingly it is intended that the scope of the invention be not limited by the foregoing exemplary description, but rather by the disclosure read in conjunction with the following claims as interpreted in light of the pertinent prior art.

We claim:

1. A suspension for a tandem axle system, said suspension including
a pair of support members for each axle connected to a base structure,
the pair of support members associated with each axle being connected to said base structure outside the axle span,
first torque transmitting members connecting each axle, below its axis, to its associated support members,
second torque transmitting members connecting each axle, above its axis, to the base structure,
said torque transmitting members being constructed and arranged to substantially eliminate axle hop,
a vertical force transmitting member connected to each support member and engaging an associated axle in force transmitting relationship,
means for transmitting forces imposed on one axle to another axle,
said means for transmitting forces from axle to axle including
a first lever member pivotally connected to a support member and associated with said vertical force transmitting member in such fashion as to be progressively rotated in a given direction upon progressive imposition of vertical forces on the axle,
a force transmitting member pivotally connected at one end portion to the aforesaid first lever member and, at the other end portion thereof, to a second lever member,
said second lever member being associated with the other axle in the tandem axle system in substantially the same functional relationship as the aforedescribed first lever member,
whereby forces causing rotation of one lever member are transmitted to said other lever member, and
means for varying the ratio of force distribution from axle to axle,
said varying means including means for connecting each end portion of the force transmitting member to its associated lever member at selected radial distances from the point of rotation of each lever member about its associated support member.

2. The suspension system of claim 1 further including force dampening means associated with the force transmitting member.

3. A suspension for a tandem axle system, said suspension including
a pair of support members for each axle connected to a base structure,
the pair of support members associated with each axle being connected to said base structure outside the axle span,
first torque transmitting members connecting each axle, below its axis, to its associated support member,
second torque transmitting members connecting each axle, above its axis, to the base structure,
said torque transmitting members being constructed and arranged to substantially eliminate axle hop,
a vertical force transmitting member connected to each support member and engaging an associated axle in force transmitting relationship, and
means for transmitting forces imposed on one axle to another axle,
said vertical force transmitting member being leaf spring means,
one end of leaf spring means being connected to its support member and the other end resting in bearing engagement on the axle whereby a variable spring rate is provided.

4. A suspension for a tandem axle system, said suspension including
a pair of support members for each axle connected to a base structure,
the pair of support members associated with each axle being connected to said base structure outside the axle span,
first torque transmitting members connecting each axle, below its axis, to its associated support members,
second torque transmitting members connecting each axle, above its axis, to the base structure,
said torque transmitting members being constructed and arranged to substantially eliminate axle hop,
a vertical force transmitting member connected to each support member and engaging an associated axle in force transmitting relationship,
means for transmitting forces imposed on one axle to another axle,
said means for transmitting forces from axle to axle including
a first lever member pivotally connected to a support member and associated with said vertical force transmitting member in such fashion as to be progressively rotated in a given direction upon progressive imposition of vertical forces on the axle,
a force transmitting member pivotally connected at one end portion to the aforesaid first lever member and, at the other end portion thereof, to a second lever member,
said second lever member being associated with the other axle in the tandem axle system in substantially the same functional relationship as the aforedescribed first lever member,
whereby forces causing rotation of one lever member are transmitted to said other lever member,
said suspension being further characterized in that
firstly, said vertical force transmitting member is leaf spring means,
one end of said leaf spring means being connected to a support member and the other end resting in bearing engagement on an associated axle whereby a variable spring rate is provided, and
secondly, said first and second levers are formed as walking beams,
each of said walking beams being disposed in bearing relationship with its associated spring means in such fashion that deflection of the spring means induces rotation of an associated lever.

5. A suspension for a tandem axle system, said suspension including
support means for connecting each of a pair of axles to a base structure,
said support means being located outside the tandem axle span, and
means for mechanically varying the allocation of load between axles.

6. A suspension for a tandem axle system, said suspension including
support means for connecting each of a pair of axles to a base structure,
said support means being located outside the tandem axle span, and
structure providing a roll center of at least about 14 inches above the height of the suspended axles.

7. A suspension for a tandem axle system, said suspension including
support means for connecting each of a pair of axles to a base structure,
said support means being located outside the tandem axle span, and
means for absorbing axle displacement, said means being located at each end portion of each axle.

8. The suspension of claim 7 further characterized in that
said displacement absorbing means comprises
leaf spring means interposed between the end portion of each axle and the support means.

9. The suspension of claim 7 further characterized in that said displacement absorbing means comprises
rubber spring means interposed between the end portion of each axle and the support means.

10. A suspension for a tandem axle system, said suspension including
support means for connecting each of a pair of axles to a base structure,
said support means being located outside the tandem axle span, and
means for substantially eliminating axle hop,
said axle hop eliminating means including
first torque rod means located above an associated axle,
second torque rod means located below said associated axle,
said first and second torque rod means being disposed in non-parallel relation to one another, and specifically within about ± 5° of the relationship $\tan A_1 = \tan A_2, X/Y$, with reference to the aforesaid drawing, whereby said supended axle is substantially isolated from unbalanced vertical forces.

11. The suspension of claim 10 further characterized in that
said means for substantially eliminating axle hop includes torque rod means located above and below a suspended axle,
said torque rod means being disposed at angles with respect to the horizontal such that the suspended axle is substantially isolated from unbalanced vertical forces.

12. The suspension of claim 10 further characterized by and including
means for decreasing the angle and length of the interaxle propeller shaft as contrasted to conventional constructions,
said means including structure for mounting the axles in non-parallel relationship to one another.

13. A suspension for a tandem axle system, said suspension including
a pair of support means for connecting each of a pair of axles to a base structure,
said pair of support means being located outside the tandem axle span,
said suspension assembly including torque rod means for connecting each axle to an associated support structure, and
spring means carried by each pair of support structures, the spring means associated with each support structure being in substantially direct contact with its associated axle.

14. The suspension for a tandem axle system of claim 13 further characterized in that
said torque rod means includes, for each axle,
first torque rod means located above its associated axle, and second torque rod means located below its associated axle, said first and second torque rod means being disposed in non-parallel relation to one another in approximately the relationship of tan $A_1 = A_2 (x/y)$ with reference to the accompanying drawing whereby said suspended axle is substantially isolated from unbalanced vertical forces.

15. The suspension of claim 13 further including means for increasing and decreasing the spacing between the suspended axles without changing the size or structure of that portion of the suspension which suspends each axle from the base structure.

16. The suspension of claim 13 further characterized in that said suspension includes an elongated tension transmitting member extending between, and connected to, each portion of the suspension which suspends each axle from the base structure, whereby the distance between the suspended axles can be varied by varying the length, but not the lineal unit weight, of the tension transmitting members.

* * * * *